United States Patent [19]

Johnson et al.

[11] 4,194,267

[45] Mar. 25, 1980

[54] HANDLING PORK LOINS

[75] Inventors: Walter W. Johnson, Downers Grove; Harry F. Bernholdt, Lombard; Robert E. Murphy, Downers Grove; John G. Killebrew, Hoffman Estates, all of Ill.

[73] Assignee: Swift & Company, Chicago, Ill.

[21] Appl. No.: 900,091

[22] Filed: Apr. 26, 1978

[51] Int. Cl.$^2$ .......................... A22C 17/00; B26D 5/20

[52] U.S. Cl. .......................................... 17/52; 17/1 R; 83/367; 83/363

[58] Field of Search ................. 17/52, 1 R; 83/71, 77, 83/363, 367

[56] References Cited

U.S. PATENT DOCUMENTS

| | | | |
|---|---|---|---|
| 2,565,727 | 8/1951 | Henderson | 17/54 |
| 2,599,328 | 6/1952 | Hoenselaar | 99/107 |
| 2,694,960 | 11/1954 | Kahle et al. | 90/11 |
| 2,913,759 | 11/1959 | Evich | 17/54 |
| 2,989,883 | 6/1961 | Zimsky et al. | 83/363 X |
| 3,159,869 | 12/1964 | Vogt et al. | 17/1 R |
| 3,175,438 | 3/1965 | Johnson | 83/77 X |
| 3,237,664 | 3/1966 | Macy et al. | 17/52 X |
| 3,762,257 | 10/1973 | Mathews, Jr. | 83/367 X |
| 3,940,998 | 3/1976 | Sourby et al. | 17/52 X |
| 3,982,299 | 9/1976 | Kompan | 17/1 R |
| 4,025,988 | 5/1977 | Hartmann et al. | 17/52 |

FOREIGN PATENT DOCUMENTS

| | | | |
|---|---|---|---|
| 556769 | 5/1977 | U.S.S.R. | 83/367 |

*Primary Examiner*—Willie G. Abercrombie
*Attorney, Agent, or Firm*—Charles E. Bouton

[57] ABSTRACT

Hog loins or other meat items are trimmed to a base weight by severing from one relatively uniform end of each loin a single portion having a length determined by the amount of actual weight of said loin which exceeds the base weight multiplied by a factor representing a lineal relationship between increments of weight and length taken from corresponding uniform ends of other loins which also exceeded the base weight.

9 Claims, 3 Drawing Figures

HANDLING PORK LOINS

This invention relates to the food processing art; and more specifically relates to an improved method and apparatus for trimming items of meat taken from animal carcasses which items are anatomically the same or symetrical and have similar shape, but are non-uniform in size, both in dimensions and weight, from carcass to carcass. Such items may be, for instance, loins from hogs and hams from hogs and similar anatomical portions of other species.

Market demands appear to give an advantage to producers who offer uniform products to the retail seller and consumer. However this presents a problem in the meat slaughtering and processing industry as the animals coming to market vary greatly in size. It has been found, for example, that retailers prefer to order items such as pork loins and hams according to specific weights rather than by weight ranges. Thus from day to day certain of such items having specific weights will command a maximum price per unit weight whereas those items which deviate above or below the specific weights are sold at a penalty less than the maximum price. Furthermore, the desired specific weights may change somewhat from time to time.

Heretofore, to accomodate this preference, the meat industry has attempted to segregate the meat items into lots of similar weights and manually trim excess weight from the larger items. There are a number of uses for the trimmings both as meat cuts and in further processed products, but even those pieces are of relatively greatest value when removed as single portions from each of the larger items. However manual trimming of the larger items is relatively inaccurate and requires a highly skilled operator if any degree of accuracy and economy is to be obtained. Usually manual trimming has resulted in plural weighing and cutting operations on each successive item.

Accordingly it would be of great advantage in the slaughtering and meat processing industry to be able to more accurately trim non-uniform meat items, preferably automatically and mechanically with high accuracy, to a number of selected base weights.

Therefore it is a principle object of the present invention to provide an improved method and apparatus for trimming non-uniform meat items to a selected base weight.

It is another object of the present invention to provide an improved method and apparatus for weighing successive meat items and assigning each item to an appropriate weight range and then accurately trimming a length of meat from one end thereof which, when removed, will reduce the weight of the meat item to the base weight of said range.

It is still another object of the present invention to provide an improved method and apparatus for accurately trimming non-uniform meat items with a single severing step to a selected base weight wherein each such meat item is assigned to one of plural contiguious weight ranges which ranges are established for the anatomical nature of said items to have a substantially linear relationship between increments of weight and length at one end thereof, and trimming each item to the base weight of said range by making a single cut at a point measured from said one end of each item.

Basically the present invention includes the steps of, and means for, measuring the weight of each successive meat item and generating a first signal representing each successive weight. Then each item is assigned, in accordance with the first signal, to an appropriate weight range and the signal is converted to a second signal, utilizing data pertinent to the relationship of weight to length of the same type of items in that weight range, which second signal represents a length of the specific item that, when removed therefrom, will reduce the weight of the item to the base weight of said range. Thereafter a portion of each item is severed at a distance from one end corresponding to the second signal.

Further objects and advantages will become apparent upon reading the following detailed specifications in conjunction with the drawings, wherein.

Figure 1:
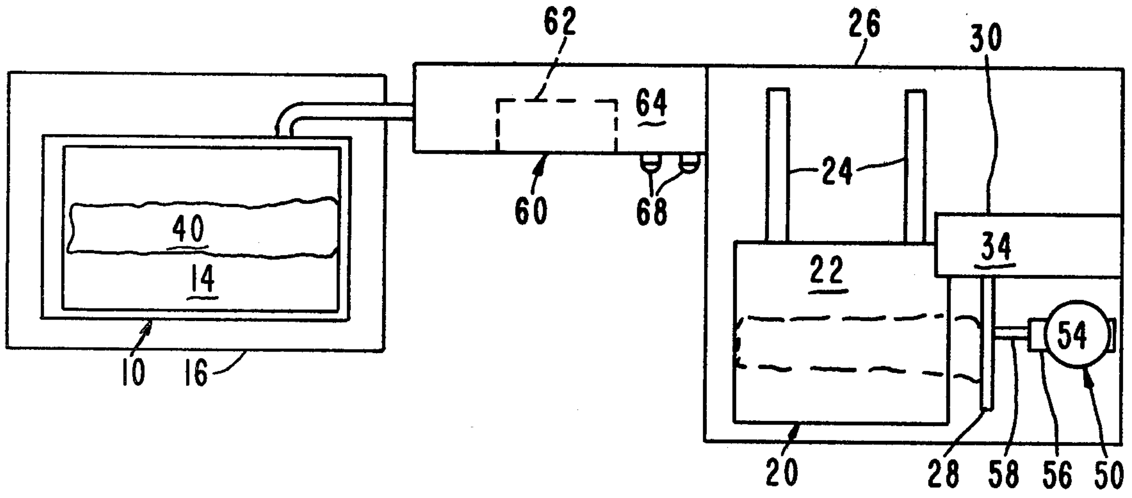
FIG. 1 is a plan view of one embodiment of an apparatus system of the present invention.
Figure 2:
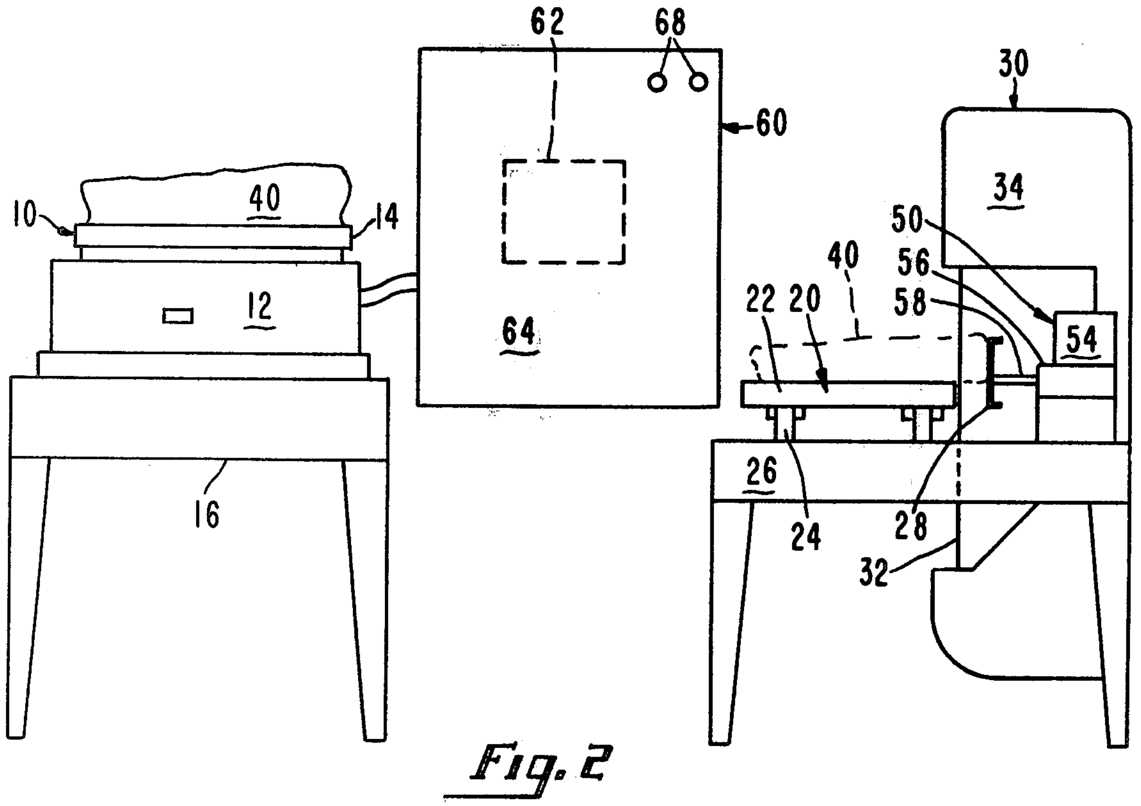
FIG. 2 is a front elevator view of the apparatus system of FIG. 1.
Figure 3:
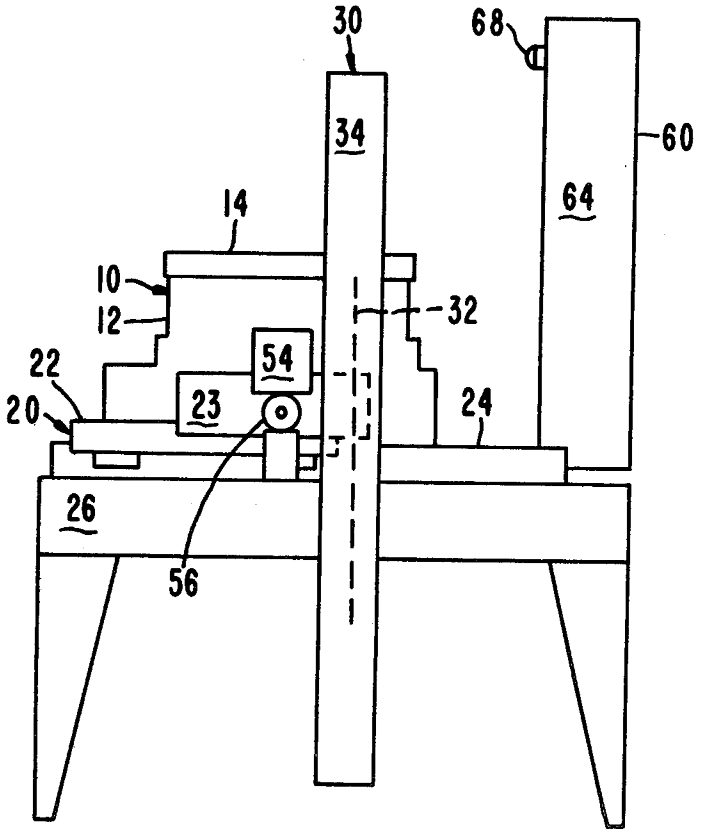
FIG. 3 is a side elevation view of the apparatus system of FIG. 1.

The foundation of the present invention was made by the discovery that at least certain anatomical meat items, which are non-uniform between animals of the same species and vary widely in weight and size and which also vary in cross section and density (fat, lean, bone and cartilage composition) throughout the length of each item, may be classified into a number of contiguous weight ranges wherein the items will be found to have a substantially linear relationship between increments of weight increase and increments of length increase at one end thereof. A linear relationship may not be present at both ends of the item so it is significant to choose as the reference end that end portion of the item that appears to have the more uniform cross section and, insofar as possible, the more uniform composition. The latter end portion will be referred to hereafter as the "trim-end". Furthermore it has been found that the same linear relationship does not extend between products in different weight ranges even where the ranges adjoin one another; however the ranges may be shifted to some extent while retaining the above noted linear relationships within each range. In the latter instances the relationship between weight increments and length increments may not be the same as between one weight range and a shifted range that overlaps a part of said one weight range.

Accordingly, in the practice of the present invention it is necessary to begin with an accumulation of data concerning the specific type of meat item to be trimmed. This data is taken by physically examining a very wide selection of items covering nearly all of the possible raw or initial weights that may be encountered in practice. The initial weight, the weight and length of severed trim-end portions, as well as the final weight of such item after trimming are recorded. The accumulated data may then be statistically analyzed and it will be found that plural weight ranges may be identified wherein the increments of length and weight of the trim-end portions have a substantially linear relationship (that is, for example, each 1/16 inch increment of length will also represent equal amounts of weight of meat). Preferably the weight ranges will be established to extend upwardly from designated base weights that are known to be popular with purchasers of the items.

Once the statistical data has been accumulated and analyzed and the weight ranges and linear relationships have been established, the initial weight of each successive meat item is measured and the item is assigned to the appropriate weight range. From that assignment the weight difference between the initial weight and appropriate base weight is determined; and the difference, in increments of weight, is readily converted by application of a proper linear factor to increments of length that are to be removed from the trim-end of the weighed item.

Thereafter the proper number of length increments are measured from the trim-end of the meat item and the item is severed substantially perpendicular to the major or longitudinal axis (length dimension) at the located point.

Apparatus to accomplish the foregoing method comprises a scale means generally 10 for weighing the meat items, a supporting means generally 20 to which each successive meat item is removed after measurement on the scale means 10, and a severing means generally 30 associated with the supporting means and operable to cut through a meat item generally 40 thereon. Preferably a movable means generally 50 is connected to one of said supporting means 20 and said severing means 30 so as to provide relative movement between those parts longitudinal of the meat item 40.

The foregoing apparatus is amenable to automatic control as by a control means generally 60 connected between the scale means 10 and the movable means 50. Preferably the control means 60 includes computer type and logic elements 62 which are programmed to store statistical data and/or precomputed weight range and weight to length ratio information.

In an actual embodiment of the invention devised to trim pork loins from hog carcasses, the scale means generally 10 is equipped with an indicator unit 12 to give both a visual display of the measured weight and a digital electrical signal representing the measured weight of a loin placed upon a platform 12. The scale means 10 is mounted upon a table 16 so as to place the scale platform 14 at a convenient operating level above a floor.

To one side of the scale means 10 is located the supporting means generally 20 which includes a movable anvil 22 slidably mounted on tracks 24 that are secured to a table 26. The anvil 22 is thereby reciprocable in a first direction with the anvil surface in a horizontal plane at a level somewhat lower than the scale platform 14. Also mounted on the table 26 to be movable in a second direction perpendicular to the first direction and at a side of the anvil 22 opposite the platform 14, is a movable saw fence 28 which is reciprocable with respect to said anvil 22 and in line with the surface thereof.

The severing means generally 30 is positioned between the anvil 22 and the movable saw fence 28 and closely adjacent the side edge of the anvil surface. In this embodiment the severing means is an endless band saw blade 32 which is trained about pulleys, not shown, and driven by an electric motor, not shown, mounted in a frame 34 supported on the table 26.

The movable saw fence 28 is connected to the movable means generally 50, which in this embodiment is a slave servo mechanism comprising an electrically reversible motor 54 gear unit 56 and threaded rod 58. The rod 58 is suitably attached to the saw fence 28 and will move same accurately in accordance with the controlled energization of motor 54. The latter is regulated by the control means 60 and a slide wire potentiometer (not shown) which is positioned to detect and control the position of the saw fence 28. Preferably the control means 60 is enclosed in a waterproof housing 64 located between the scale means 10 and supporting means 20.

In turn the control means 60 is operatively connected as by either or both electric and hydraulic or pneumatic lines, not shown, to the indicator unit 12 and the slave servo mechanism. The control means 60 may also include a transducer connected between the saw fence 28 and anvil 22 to continuously sense the exact location of the saw fence.

The control means 60 functions to receive a first electrical digital signal from the scale indicator unit 12 and to convert that first signal to a second command signal which is sent to the slave servo to cause the latter to move the saw fence 28 to a distance from the anvil edge and saw blade 32 that is equal to the proper length of a portion to be trimmed from a meat item 40 located upon the scale platform 14. An operator places a first meat item upon the scale platform 14 and switches the control means 60 to an operative mode. The saw fence 28 will be automatically moved to the proper trim position to receive the trim-end of the first meat item; and an operator manually transfers the first meat item to rest upon the anvil 22 with the trim-end thereof being placed against the saw fence 28. Thereafter the operator energizes the band saw motor and manually reciprocates the anvil 22 so as to pass the first meat item across the moving blade 32. The trimmed-end portion will fall from the anvil at a point beyond the blade 32 and the trimmed item is removed from the anvil when it is returned to the beginning position. Thereafter the procedure is repeated with each successive meat item.

The control means is also preferably provided with a pair of indicator lights 68 to signal the operator either that the item being weighed is within an acceptable tolerance of a base weight requiring no trim, or that the saw fence 28 is in position for the severing step to be conducted.

In the above described embodiment for trimming pork loins the data accumulated for programming the control means 60 was obtained and analyzed as follows. The initial weight, final weight, and total length of trimmed-end portions cut by hand from each of 241 randomly selected pork loins was collected and recorded. The loins had been trimmed to prevailing base weights of about 17.5 and 22.5 pounds. The initial loin weights ranged from about 17.3 pounds to 27.5 pounds. (Those loins weighing 17.5 pounds or less and 21.6–22.6 pounds were not trimmed). The collected data was classified into ten subgroups for the purpose of analysis.

Final weights were subtracted from the initial weights to determine the weight loss (or trim) for each loin. The length of trimmed portions had been recorded in decimal inches and was converted to eighth and sixteenth inches; and for each loin the number (or fraction) of pounds trimmed per sixteenth and eighth inch was computed by dividing weight loss by length trimmed.

Average and standard deviations were tested for each of the subgroups. Analysis of the data confirmed that a substantially linear relationship existed between weight and length of the trimmed-end portions within each of the groups ranging below and above 22.5 pounds, respectively. However it was concluded, for practical market purposes, that subsequent trimming operations should not reduce loins weighing 17.5 pounds or less or weighing between 21.6–22.5 pounds. Otherwise the accumulated data was processed to determine the average amount of weight reduction per 1/16 inch trim for the weight ranges analyzed. The linear relations were as follows:

range 17.6–22.4 lbs.: per 1/16 inch.—0.06118 lbs.

range 22.6–27.5 lbs.: per 1/16 inch.—0.07248 lbs.

Thus the computer and logic elements 62 of the loin trimming embodiment were programmed to reduce loins by 1/16th inch for each 0.06118 lbs. in excess of a base weight of 17.5 lbs. for loins within the range of 17.5 to 21.5 lbs.; and to reduce loins by 1/16th inch for each 0.07248 lbs. in excess of a base weight of 22.5 lbs and extending up to 28.5 lbs.

It was subsequently found that a substantial number of even smaller hogs were coming to market with loins weighing less than those in the above-described groups. Accordingly 288 such smaller loins weighing between about 14.0 pounds and 17.2 pounds were similarly examined and trimmed and the accumulated data analyzed. It was found that a substantially linear relationship also existed in this group and projectible to about 17.4 pounds. The average relationship was:

range 14.0–17.4 lbs.: per 1/16 inch.—0.05505 lbs.

Similar provision may be made to accommodate additional base weights and ranges within the same or a larger spectrum of sizes of loins and other meat items.

It is also to be noted however, that the larger loins are obtained from the relatively larger mature animals coming to market (usually older animals of up to three and four years) and those larger animals, as a group, have a greater variation in weight than occurs among the smaller size animals (which usually are of a more uniform age of about six months). Thus since the linear relationships are based on averaged data there may tend to be a somewhat larger possible variation from the liner relationships in the larger weight group, as compared to the lower weight group.

Since the foregoing figures represent averages which are subject to small but standard deviations it may be desirable to modify the figures to provide a selected confidence limit so as to assure that the trim of an actual loin will not reduce it below the target base weight. This can be done by well known mathematical technique.

It will be understood that the apparatus may be modified to include other features such as a holding mode circuit on the control means to permit the weighing of the next successive meat item while a first item is moved to the anvil 22 and trimmed. Also it will be understood that the apparatus may be modified to even further automate the operation as by delivery of items to the scale means, transfer of items to the supporting means, and combining the scale and supporting means, etc. without departing from the spirit and scope of the present invention.

Obviously many modifications and variations of the invention as hereinbefore set forth may be made without departing from the spirit and scope thereof, and, therefore, only such limitations should be imposed as are indicated in the appended claims.

We claim:

1. An improved method of trimming meat items of variable non-uniform weight and size to an appropriate accurate weight selected from a plurality of acceptable weights, said method comprising:

establishing a series of at least two contiguous weight ranges from the available spread of individual weights of said meat items wherein for each said range the increments of weight above a base weight for each range tend to vary linearly with increments of length measured from one end of said meat items;

determining the linear relationship between increments of weight and increments of length measured from said one end of said meat items for each said range;

thereafter measuring the weight of each successive meat item;

generating a first signal for each successive meat item, said first signal representing the amount of weight of said item;

assigning each successive meat item to an appropriate weight range in accordance with said first signal;

converting each said first signal to a second signal representing a number of increments of length of said meat item measured from said one end thereof that will include the excess weight of said item above a base weight in said appropriate weight range;

and severing a portion from each respective meat item measured by length from said one end, said portion being of a length corresponding to the number of increments represented by said second signal for each respective meat item.

2. The method of claim 1 wherein said one end is an end of said meat item having relatively more uniform cross section and composition with respect to the other and thereof.

3. The method of claim 2 wherein said meat items are pork loins.

4. The method of claim 1 wherein the severing step is accomplished by adjusting the distance between a severing means and a movable fence member in accordance with said second signal and placing said one end of said meat item against said fence.

5. An improved apparatus for trimming meat items of variable non-uniform weight and size, said apparatus comprising:

scale means for weighing successive meat items, said scale means including means for generating a first signal representing measured weight;

converting means for receiving said signal and producing a second signal representing a number of increments of length known to have a substantially linear relationship to the amount said measured weight exceeds a base weight within a selected weight range, said converting means including a computer member that is programmed to respond to said first signal and assign same to one of at least two weight ranges and to produce a second signal representing a number of increments of length bearing a substantially lineal relationship to the increment of measured weight exceeding a selected base weight of the assigned weight range;

supporting means for receiving each successive meat item from said scale means and positioning an end of said meat item;

severing means adjacent said supporting means, said severing means being operable to cut along a path across said meat item;

movable means attached to move at least one of said supporting means and said severing means with respect to the other so as to adjust the location of said path in accordance with said second signal from said converting means.

6. The apparatus of claim 7 wherein said supporting means includes an adjustable fence member to position an end of said meat item with respect to said severing means.

7. The apparatus of claim 8 wherein said severing means is a band saw, the blade of said band saw being trained in a vertical path adjacent one edge of said supporting means.

8. The apparatus of claim 7 wherein said supporting means includes an anvil slidably mounted so as to be reciprocable horizontally in a first direction past said vertical path of said band saw blade, and wherein said supporting means also includes a movable saw fence spaced from said anvil beyond said saw blade and being reciprocable in a second direction perpendicular to said first direction, said saw fence being adjustable to position an end of said meat item with respect to said saw blade.

9. The apparatus of claim 8 including movable means attached to adjustably reciprocate said saw fence, said movable means being connected to said converting means and being controlled thereby.

* * * * *